(12) United States Patent
Ishihara

(10) Patent No.: US 7,369,277 B2
(45) Date of Patent: May 6, 2008

(54) IMAGE PROCESSING APPARATUS, DRAWING PROCESSING METHOD, AND COMPUTER PROGRAM

(75) Inventor: Hiroshi Ishihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1017 days.

(21) Appl. No.: 10/390,938

(22) Filed: Mar. 18, 2003

(65) Prior Publication Data

US 2004/0027617 A1 Feb. 12, 2004

(30) Foreign Application Priority Data

Mar. 18, 2002 (JP) .............................. 2002-073776
Sep. 19, 2002 (JP) .............................. 2002-272746
Feb. 19, 2003 (JP) .............................. 2003-040550

(51) Int. Cl.
*H04N 1/405* (2006.01)
*G06K 15/02* (2006.01)

(52) U.S. Cl. ............... 358/3.13; 358/1.9; 358/1.16; 358/1.17; 358/3.23; 358/3.14; 358/3.16; 358/3.19; 345/596; 345/597; 345/598; 345/599; 345/619; 715/502

(58) Field of Classification Search ............ 358/1.16, 358/1.17, 3.13, 3.23, 3.14, 3.16, 3.19, 1.9; 345/596–599, 619; 715/502, 911
See application file for complete search history.

(56) References Cited

U.S. PATENT DOCUMENTS 4,706,074 A * 11/1987 Muhich et al. ............ 345/157
4,730,185 A * 3/1988 Springer et al. ........... 345/536
4,797,941 A * 1/1989 Lloyd et al. ............... 382/205
5,003,496 A * 3/1991 Hunt et al. ................ 345/582
5,216,753 A 6/1993 Ng
5,295,235 A * 3/1994 Newman .................... 345/619
5,307,451 A * 4/1994 Clark ........................ 345/427
5,548,689 A 8/1996 Poppenga et al.

(Continued)

FOREIGN PATENT DOCUMENTS

EP 0753832 A2 * 1/1997

(Continued)

OTHER PUBLICATIONS

U.S. Appl. No. 08/004,569 of Hiroshi Ishihara, filed Jan. 14, 1993.

*Primary Examiner*—Aung S. Moe
*Assistant Examiner*—Beniyam Menberu
(74) *Attorney, Agent, or Firm*—Cooper & Dunham, LLP

(57) ABSTRACT

A drawing instruction processor refers to a bit map line table that shows whether the bit arrays in the row unit are the same in the order of concentrations. The drawing instruction processor decides whether dither patterns to be used for the adjacent specified drawing ranges are the same, by referring to the BLT, and links the drawing ranges to which the same pattern can be applied. Based on this, the drawing processor carries out a batch writing using a dither pattern prepared in advance into the specified range in the page memory. The dither pattern to be used for the drawing is prepared by linking a plurality of the same basic patterns to have a length corresponding to the length of the word length. As a result of such an arrangement, it is possible to achieve a high-speed processing.

8 Claims, 11 Drawing Sheets

U.S. PATENT DOCUMENTS

| | | | |
|---|---|---|---|
| 5,550,972 A * | 8/1996 | Patrick et al. | 345/537 |
| 5,696,946 A * | 12/1997 | Patrick et al. | 345/559 |
| 5,706,105 A * | 1/1998 | Naylor, Jr. | 358/3.23 |
| 5,717,845 A * | 2/1998 | Patrick et al. | 345/676 |
| 5,852,710 A * | 12/1998 | Shiohara et al. | 358/1.16 |
| 5,872,574 A * | 2/1999 | Hara et al. | 345/441 |
| 5,933,588 A * | 8/1999 | Easwar et al. | 358/1.17 |
| 6,052,202 A * | 4/2000 | Shimizu | 358/1.16 |
| 6,100,996 A * | 8/2000 | Amano et al. | 358/1.9 |
| 6,192,159 B1 * | 2/2001 | Wood et al. | 382/245 |
| 6,226,011 B1 * | 5/2001 | Sakuyama et al. | 345/600 |
| 6,389,175 B1 * | 5/2002 | Wood et al. | 382/245 |
| 6,577,777 B1 * | 6/2003 | Yoshino et al. | 382/284 |
| 6,683,618 B1 * | 1/2004 | Patrick et al. | 345/619 |
| 6,829,063 B1 * | 12/2004 | Allebach et al. | 358/3.13 |
| 7,023,577 B2 * | 4/2006 | Watanabe et al. | 358/1.9 |
| 7,088,479 B2 * | 8/2006 | Fujita | 358/536 |
| 2003/0147098 A1 * | 8/2003 | Gnutzmann | 358/2.1 |
| 2005/0206653 A1 * | 9/2005 | Beaumont | 345/629 |

FOREIGN PATENT DOCUMENTS

| | | |
|---|---|---|
| JP | 7168681 | 7/1995 |
| JP | 2000-138823 * | 5/2000 |
| JP | 20013954 | 1/2001 |

* cited by examiner

| By | B0 | B1 | B2 | B3 | B4 |
|---|---|---|---|---|---|
| 0 (FIRST ROW) | 0 | 0 | 2 | 2 | 4 |
| 1 (SECOND ROW) | 0 | 1 | 1 | 1 | 4 |
| 2 (THIRD ROW) | 0 | 0 | 0 | 3 | 4 |

DITHER PATTERN OF L=3

THRESHOLD VALUE TABLE

IMAGE PROCESSING APPARATUS, DRAWING PROCESSING METHOD, AND COMPUTER PROGRAM

BACKGROUND OF THE INVENTION

1) Field of the Invention

The present invention relates to an image processing apparatus and an image processing method for generating drawing data following a drawing instruction described in a page description language (PDL) or the like, and outputting an image drawn by using the generated drawing data.

2) Description of the Related Art

An image output apparatus such as a printer outputs an image onto a medium like a sheet of printing paper based on image information. This image output apparatus generates drawing data following a drawing instruction described in the PDL (which is usually transmitted from a host computer to a printer, in a printer system), and outputs the image onto the medium by using the generated drawing data. This image output apparatus receives the drawing instruction in the PDL format, and can carry out a graphic drawing based on the image information having a gray scale (i.e., gradation). Based on the graphic drawing instruction, the image output apparatus receives the instructions of a graphic range, concentration, and a filling of the graphic range, and can output a gradation image onto the medium.

As conventional examples of this graphic drawing that uses the gray scale, there are two Patent Literatures: Japanese Patent Application Laid-Open Nos. 7-168681 (hereinafter, "first patent literature") and 2001-13954 (hereinafter, "second patent literature").

The first patent literature titled "A PDL data processing apparatus, a control method therefor, and a pattern expanding apparatus" discloses an example of patterns A to D (refer to FIG. 29) that are used to draw an image, as an embodiment of a grayscale drawing. According to the first patent literature, when a new pattern appears, the old pattern data is deleted, and this new pattern is loaded. The first patent literature shows an example of loading two patterns (refer to FIG. 31), and a pattern count 3 deletes the pattern A to load the pattern C. The first patent literature assumes the drawing of an image under the condition that there occurs no significant problem when two patterns are loaded.

The first patent literature titled "A drawing apparatus, a drawing method, and a storage medium" discloses three image generators, including a mask generator, a background generator, and a gray generator. The gray generator generates a gray image based on object data. The gray generator writes gray image data into an address (which is determined based on the data generated from the mask generator and the background generator) at which the image is to be drawn on the image memory, based on a logic processing.

When the first patent literature is applied to the input drawing data like the photographic image having a mild gradation change, with different concentrations between adjacent pixels (i.e., different gradations corresponding to the number of pixels), the pattern data of the output image are loaded and deleted frequently. Consequently, the processing speed is reduced unavoidably. When there are pattern registers corresponding to the number of pixels, it is theoretically possible to avoid the reduction in the processing speed. However, this method is not realistic. Further, with the hardware disclosed in the first patent literature, it is difficult to hold the registers corresponding to the number of pixels, and this is not realistic from the viewpoint of cost. According to the second patent literature, only the gray data is input to the gray generator. Therefore, when the gray data changes corresponding to the number of pixels of the image such as the photographic image, the bit processing unit (BPU) operates by the number of times corresponding to the number of pixels, which hinders the increase in the processing speed.

The image output apparatus outputs a drawing image having a gradation, based on the graphic drawing instruction using the PDL. The apparatus follows the drawing instruction to fill a specified image drawing range in the page memory by using the specified concentration. According to the conventional practice, the image output apparatus processes each specified drawing range with the specified drawing range as a unit. Therefore, when there are various concentrations between adjacent drawing ranges (i.e., between pixels of the input drawing) like those of a photographic image that has a mild gradation change, each small drawing range has a specified concentration. The image output apparatus writes the bit map data using the concentration specified for each drawing range, into the page memory.

The image output apparatus usually writes the bit map data into the page memory by filling the drawing range with the data in a predetermined dither pattern (i.e., bedding in a tiled pattern) corresponding to the pixel concentration. Therefore, when the image output apparatus processes the photographic image, the apparatus repeats frequently a predetermined drawing processing, including a bit shifting of applying a dither pattern, to each small drawing range. This makes it difficult to increase the processing speed.

As explained above, according to the conventional methods of expanding the drawing data of a gradation image into the page memory based on the PDL graphic drawing instruction, it has been difficult to realize the high-speed processing when the method is applied to an image like a photographic image that has a mild gradation change.

SUMMARY OF THE INVENTION

It is an object of this invention to solve at least the problems in the prior art.

The image processing apparatus according to one aspect of the present invention comprises an input unit that inputs a graphic drawing instruction based on image data; a drawing processing unit that obtains and holds a bit map pattern corresponding to the specified concentration, based on the input graphic drawing instruction to fill an optionally specified range in a page memory using a specified concentration, calculates a coordinate position of holding the bit map pattern corresponding to the specified coordinate position in the page memory, and writes the drawing data using the bit map pattern of the corresponding specified concentration in a tiled pattern, into the specified range in the page memory, following the obtained coordinate position; and an output unit that outputs the drawing data written in the page memory, to an output apparatus. The drawing processing unit decides whether the bit map patterns to be used in adjacent specified drawing ranges are the same, links the specified drawing ranges to which the same bit map pattern can be applied based on a result of the decision made, specifies again the drawing range in the page memory, and batch writes the bit map pattern into the adjacent specified drawing ranges.

The drawing processing method according to another aspect of the present invention comprises an input step of inputting a graphic drawing instruction based on image data; and a drawing processing step of obtaining and holding a bit map pattern corresponding to the specified concentration, based on the input graphic drawing instruction to fill an optionally specified range in a page memory using a specified concentration, calculating a coordinate position of holding the bit map pattern corresponding to the specified coordinate position in the page memory, and writing the drawing data using the bit map pattern of the corresponding specified concentration in a tiled pattern, into the specified range in the page memory, following the obtained coordinate position. The drawing processing step is for deciding whether the bit map patterns to be used in adjacent specified drawing ranges are the same, linking the specified drawing ranges to which the same bit map pattern can be applied based on a result of the decision made, specifying again the drawing range in the page memory, and batch writing the bit map pattern into the adjacent specified drawing ranges.

The computer program according to still another aspect of the present invention realizes the method according to the present invention on a computer.

These and other objects, features and advantages of the present invention are specifically set forth in or will become apparent from the following detailed descriptions of the invention when read in conjunction with the accompanying drawings.

DETAILED DESCRIPTION

Figure 1:
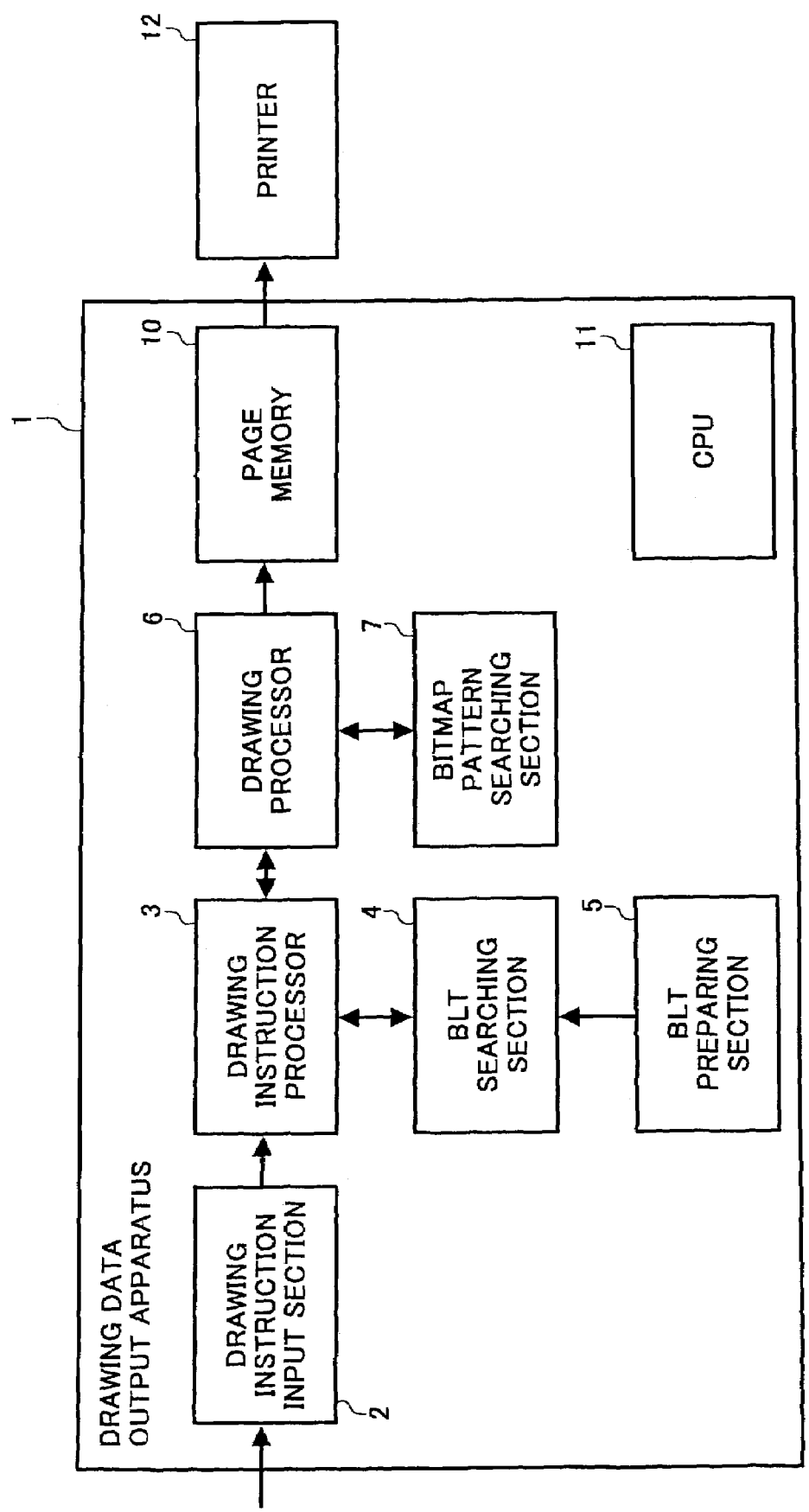
FIG. 1 shows a schematic structure of an image output apparatus according to a first embodiment of the present invention.

Exemplary embodiments of the present invention will be explained below with reference to the accompanying drawings.

Embodiments of the image processing apparatus and the image processing method according to the present invention, that have the object of increasing the drawing speed of writing a bit map pattern, in a tiled pattern using a specified concentration into a specified range in the page memory will be explained below. An image output apparatus, such as a printer, will be explained as an example. The present invention can be also applied to an apparatus that outputs an image to a medium like a display other than a paper medium onto which the printer outputs the image.

In the printer system, when a printer carries out a drawing processing like some of the existing laser printers, it is possible to achieve this processing by loading necessary processing functions onto a printer controller. When a host computer carries out a drawing processing like some of the inkjet printers, it is possible to achieve this processing by loading necessary processing functions onto a printer driver. When the printer controller or the printer driver carries out the drawing processing, it is possible to implement the necessary functions by loading onto a Central Processing Unit (CPU) a program that makes this computer execute each step of a drawing processing method to be described later.

In order to speed up the drawing processing, in the present embodiment, it is made possible to carry out a batch writing of the same bit map pattern to adjacent specified drawing ranges to which the same bit map pattern can be applied. To carry out the batch processing, a concentration conversion table, that is, the BLT, is introduced. Based on this, the processing efficiency of repetitively using the same bit map pattern is improved.

FIG. 1 shows a schematic structure of the image output apparatus according to the first embodiment. The image output apparatus shown in FIG. 1 consists of a drawing data output apparatus 1, and a printer 12. The drawing data output apparatus 1 includes a drawing instruction input section 2, a drawing instruction processor 3, a BLT searching section 4, a BLT preparing section 5, a drawing processor 6, a bit map pattern searching section 7, a page memory 10, and a central processing unit (CPU) 11.

The outline operation of the image output apparatus shown in FIG. 1 will be explained below based on the flow of the drawing processing. A graphic drawing instruction to draw image data is input to the drawing data output apparatus 1. The drawing instruction input section 2 receives this graphic drawing instruction, interprets the drawing data based on the input instruction, obtains a drawing expressed as a set of a drawing range and a concentration, as a result of the interpretation, and passes the drawing to the drawing instruction processor 3.

The drawing instruction processor 3 checks Y coordinate ranges in a sub-scanning direction included in the whole received pixels, and rearranges the whole pixels included in each Y coordinate in the X coordinate. In this case, it is assumed that the X-Y drawing coordinate system is set such that the main scanning direction corresponds to the X axis, and the sub-scanning direction corresponds to the Y axis. The drawing instruction processor 3 inputs the Y coordinate to be drawn and the concentration of each pixel (where the drawing range is indicated in the X coordinate) to the BLT searching section 4. The BLT searching section 4 obtains a concentration that has the same bit map pattern as that of the input concentration within the input Y coordinate (i.e., on the main scanning line), by referring to the Bit map Line Table (BLT) described later prepared in advance by the BLT preparing section 5. The BLT searching section 4 returns the obtained concentration to the drawing instruction processor 3. The drawing instruction processor 3 calculates all the X coordinate ranges of adjacent pixels of which concentrations are the same as the concentration that the BLT searching section 4 obtained. The drawing instruction processor 3 passes the obtained X coordinate ranges and the concentration to the drawing processor 6.

The drawing processor 6 inputs the received concentration to the bit map pattern searching section 7. The bit map pattern searching section 7 obtains the bit map pattern. The CPU 11 carries out the processing to the page memory 10, by using the bit map pattern, the concentration and the X coordinate ranges received from the drawing instruction processor 3, and the corresponding contents in the page memory 10. The drawing processor 6 changes the page memory 10 based on a result of the processing carried out by the CPU 11.

When the drawing processor 6 completes the writing of all the lines into the page memory 10, the CPU 11 issues an end of drawing instruction or an output instruction to the output apparatus. Based on this instruction, the output apparatus outputs the contents of the page memory 10 to the printer 12.

In the present embodiment, the CPU is used to carry out the processing up to the generation of the page memory. It is also possible to carry out this processing by applying the present invention to a dedicated application specific integrated circuit (ASIC) such as a graphic accelerator, instead of the software processing using the CPU of the printer. It is also possible to realize the increase in the processing speed based on this system.

The BLT, which is used for the batch drawing processing, will be explained in detail next.

Figure 2:
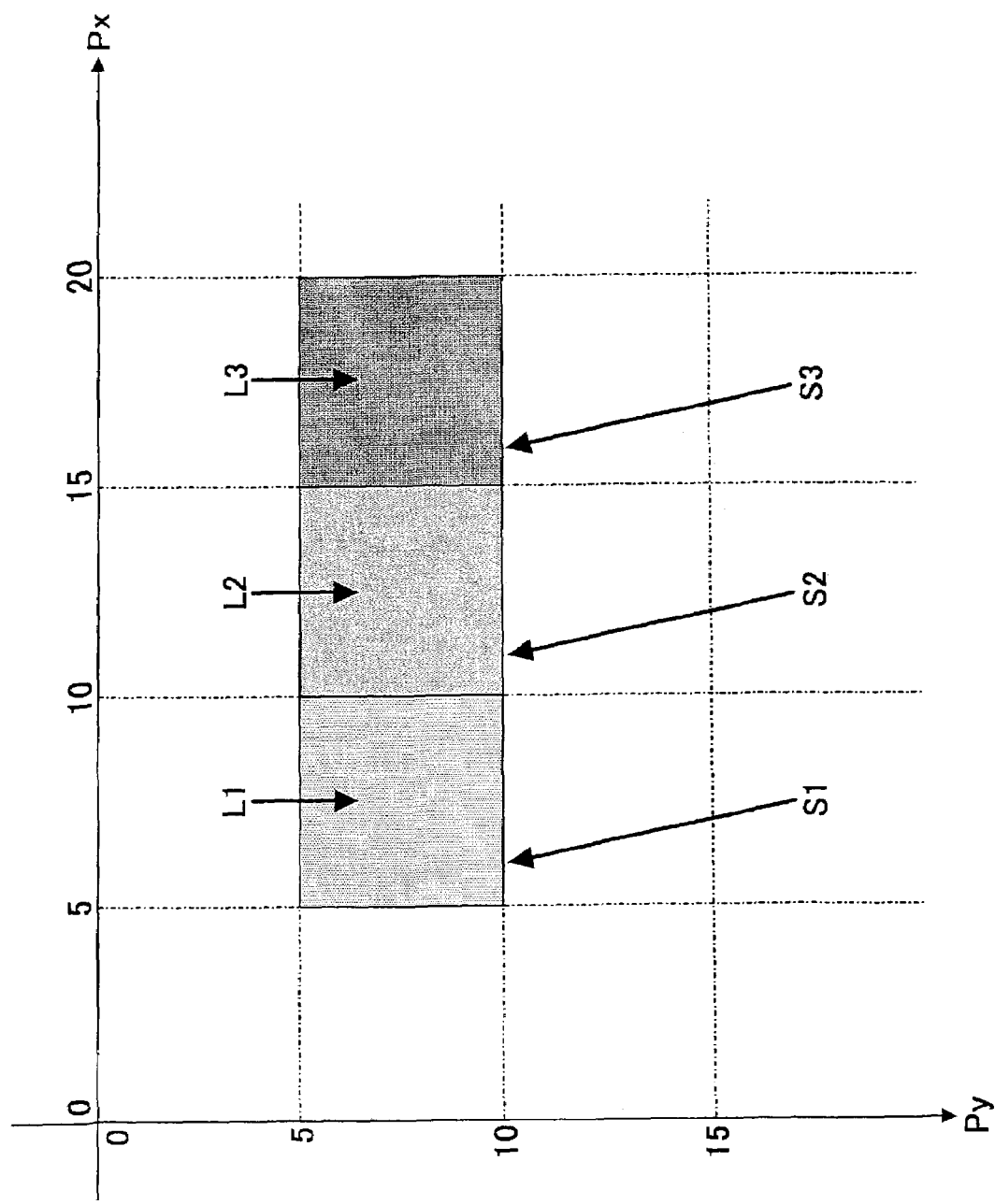
FIG. 2 is an explanatory diagram of input pixels S1, S2, and S3 (with corresponding concentrations L1, L2, and L3) to be drawn.

An input pixel (i.e., a graphic drawing instruction) to be used for the drawing processing will be explained based on FIG. 2. The input pixels form an image consisting of pixels arranged in a grid generally used for a picture image. In FIG. 2, each of the adjacent pixels is expressed as S. FIG. 2 shows a drawing consisting of three pixels S1, S2, and S3 having mutually different concentrations. Graphic coordinates of the three pixels S1, S2, and S3 are expressed as P1, P2, and P3 respectively. The graphic coordinate P1 is a rectangle having a diagonal from a left lower point (5, 5) to a right higher point (9, 9). Similarly, the graphic coordinate P2 is a rectangle having a diagonal from a point (10, 5) to a point (14, 9), and the graphic coordinate P3 is a rectangle having a diagonal from a point (15, 5) to a point (19, 9). An optional point on the coordinates in which the image is drawn is expressed as (Px, Py).

The concentrations of the pixels S1, S2, and S3 that constitute the drawing are expressed as L1, L2, and L3 respectively. L1, L2, and L3 are intermediate concentrations respectively. Each concentration L is expressed in an integer from 0 to 255 that can be expressed in 8 bits. This integer directly represents each concentration (i.e., brightness). This drawing data structure is a general data structure of a gray scale picture image. When the L is an index that shows a combination of the values of red, green, and blue (RGB), it is also possible to form a data structure of a color picture image that can be expressed in 256 colors.

To draw an image of the concentration L indicated in the input pixels (i.e., the graphic drawing instruction), a bit map pattern corresponding to the concentration is used. An existing dither pattern can be used for the bit map pattern.

Figures 3, 4:
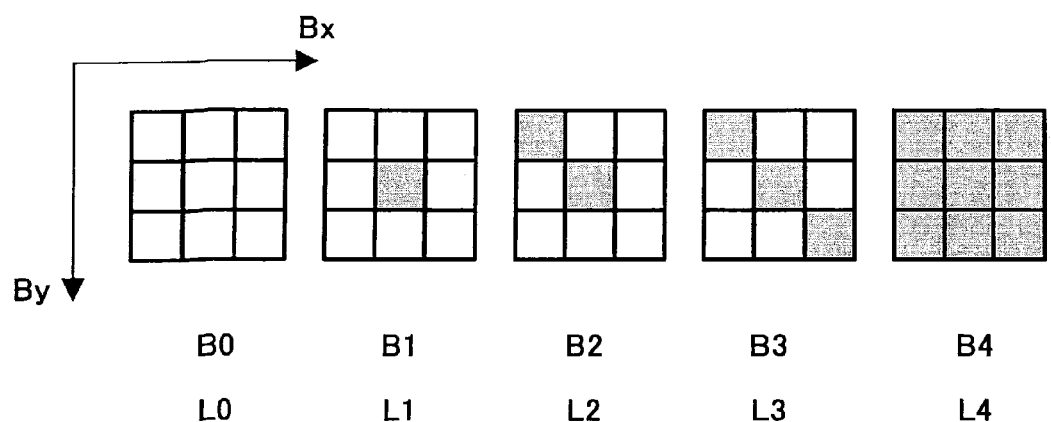
FIG. 3 shows one example of bit map patterns B0 to B4 corresponding to the concentrations L0 to L4.
FIG. 4 is a concentration conversion table, that is the bit map line table (BLT) prepared based on the bit map patterns B0 to B4 shown in FIG. 3.

FIG. 3 shows one example of bit map patterns that are used in the present embodiment. FIG. 3 shows bit map patterns B1, B2, and B3 that correspond to the concentrations L1, L2, and L3 shown in FIG. 2 respectively, B0 (i.e., all bits are OFF) that means the concentration 0%, and B4 (i.e., all bits are ON) that means the concentration 100%. The width and the height of the bit map are expressed as Bw and Bh respectively. Each concentration has the same Bw and has the same Bh respectively. In this example, it is assumed that Bw=Bh=3. In other words, each bit map has sizes of 3×3. An optional point on each bit map pattern coordinate system is expressed as (Bx, By).

The BLT is used to make it possible to carry out a batch writing of the same bit map pattern (i.e., a repetitive writing of the same pattern) into adjacent drawing ranges to which the same bit map pattern can be applied. The reference to the concentration having the same pattern is instructed based on this table.

FIG. 4 shows the BLT prepared based on the bit map patterns B0 to B4 shown in FIG. 3. The table preparation procedure will next be explained.

The batch writing is based on the condition that the same pattern is repetitively written in the main scanning line direction (i.e., in the row direction). Therefore, this table is prepared by comparing the state of the same row of each of the bit map patterns B0 to B4. In the example shown in FIG. 3, the table data is prepared for each row from By=0 (i.e., the first row) to the By=2 (i.e., the third row) of the bit map patterns B0 to B4 respectively. The steps of preparing the data for the row By=0 (i.e., the first row) of the bit map patterns B0 to B4 are as follows. The adjacent bit map patterns are compared starting from the bit map pattern of the lowest concentration (i.e., B0) to the highest concentration (i.e., B4) in the first row. In the table shown in FIG. 4, the value of the row b of Ba is expressed as BLT [a, b]. Therefore, 0 (that means the own bit map pattern B0) is input to the first row of BLT [0, 0] in the table. Next, the first row of B1 is the same as the first row of B0 (that is, all the three bits are OFF). Therefore, 0 that means the B0 is input to the first row of BLT [1, 0]. Next, the first row of B2 is different from the first row of B1. Therefore, 2 that means the own bit map pattern B2 is input to the first row of BLT [2, 0]. Similarly, the first row of B3 is the same as the first row of B2. Therefore, 2 that means B2 is input to the first row of BLT [3, 0]. As B4 is different from B3, 4 that means B4 is input to the first row of BLT [4, 0]. The similar processing is repeated for each row (up to the third row, in this example). As a result, the BLT as shown in FIG. 4 is obtained.

At the above steps of preparing the BLT, a bit map pattern (the B4 side) of a higher concentration refers to a bit map pattern (the B0 side) of a lower concentration. However, it is also possible to prepare the BLT at the opposite steps such that a bit map pattern B0 of a lower concentration refers to a bit map pattern B4 of a higher concentration.

As explained above, it is possible to obtain the BLT based on the bit map patterns B0 to B4. The BLT is unchanged so long as there is no change in the bit map patterns, and the BLT keeps static values. Therefore, it is possible to prepare the BLT and the bit map patterns in a pair. While it is also possible to always keep the BLT and the bit map patterns in a pair, it is possible to obtain the BLT by calculation based on the bit map patterns when necessary. Therefore, instead of keeping the BLT at all times, it is possible to calculate the values of the BLT only once at the time of starting up the apparatus (that is, at the time of initializing the system operation), and use the values until when the system operation ends. Based on this, it is possible to save the capacity of the nonvolatile memory necessary to keep the data at all times. At the same time, it is possible to carry out the processing at a higher speed than when calculating the values of the BLT each time when the drawing instruction is issued.

According to the system using the above BLT, the way of holding the data of each bit map pattern B (i.e., the way of preparing data) changes. Conventionally, as a normal method, when it is possible to obtain all pixels of bit map patterns B (i.e., the bitmaps of 3×3 shown in FIG. 3) corresponding to the concentrations L, the apparatus can carry out the drawing at an optional position P, even when the concentration L changes frequently. For the Y coordinate By of a certain bit map pattern B, the BLT proposed in the present embodiment makes it possible to carry out the drawing using a smaller number of patterns than the total number of bit map patterns B (i.e., five patterns of B0 to B4 in FIG. 3). For example, when the second row of the BLT shown in FIG. 4 is looked at, the second rows of B1, B2, and B3 are the same. Therefore, only three Bs of B0, B1, and B4 are necessary. Similarly, only three Bs are necessary in the first and third rows of this table. However, this is based on the assumption that the Y coordinate By of the bit map pattern B is uniquely determined based on the drawing coordinate Py. This condition is necessary to draw a bit map pattern in a tiled pattern.

Pixels to be batch drawn have a general pattern of rectangular bit map patterns as shown in the present embodiment. Therefore, this method is effective when the apparatus draws a relatively simple pattern such as an icon or a bit map that the user or the application assigns.

Figure 5:
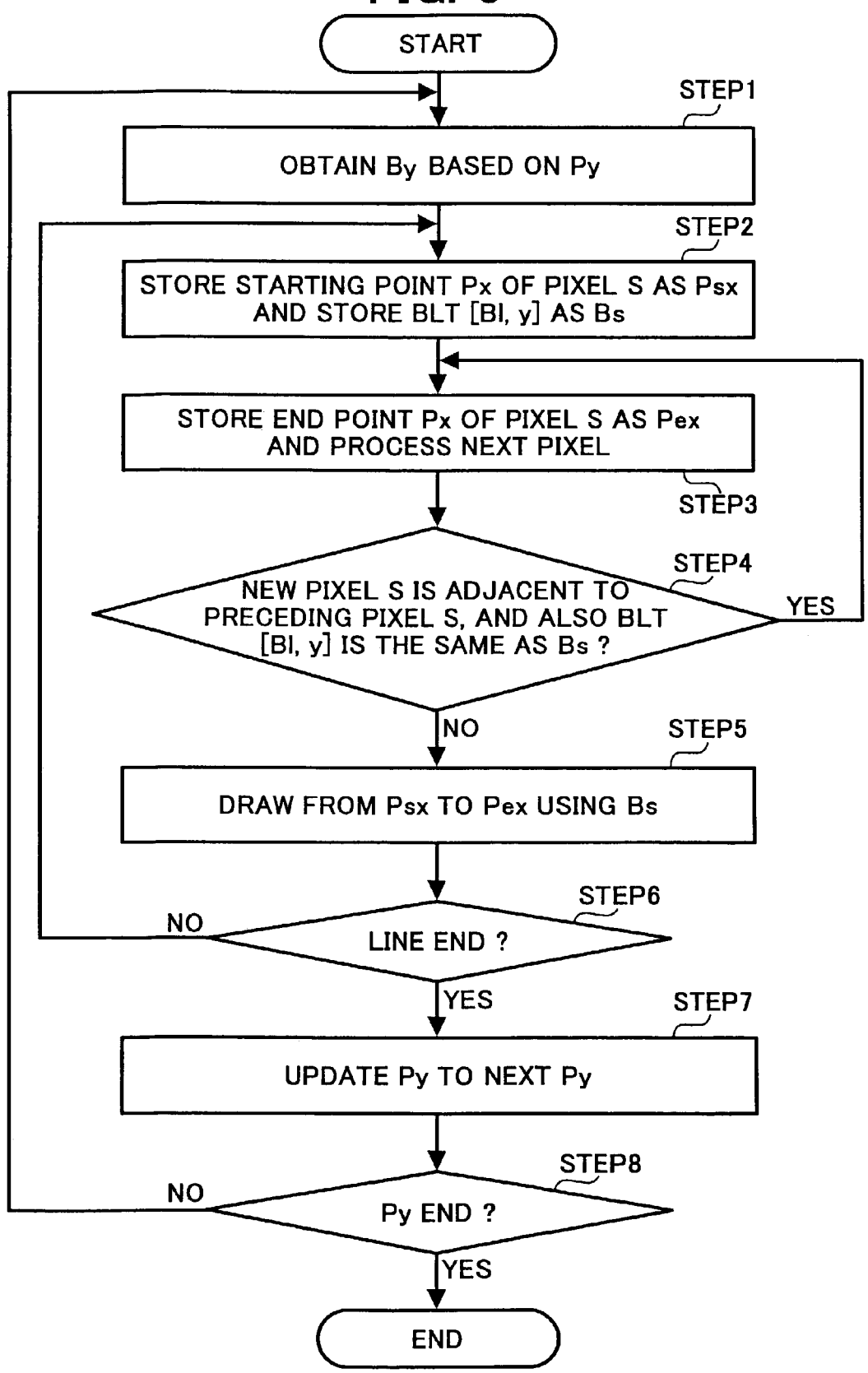
FIG. 5 is a processing flow of a batch drawing processing using the BLT according to the first embodiment of the present invention.

An example of a batch drawing processing using the BLT will be explained in detail with reference to FIG. 5. The processing flow shown in FIG. 5 is used to draw the drawing shown in FIG. 2 based on the bit map patterns and the BLT shown in FIG. 3 and FIG. 4 respectively.

The apparatus carries out a batch drawing processing by repeating the drawing of each line based on one main scanning line (the X axis) while sequentially changing the line position (i.e., in the direction of the sub-scanning Y axis). As shown in FIG. 5, the apparatus first carries out the coordinate calculation of relating a coordinate position Py of the drawing range to a bit map pattern that is to be drawn at this position (step 1). This is a calculation of obtaining the Y coordinate position By of the bit map pattern B used to draw on the specified coordinate Py of the Y axis, in order to draw the pixels S1, S2, and S3 in the page memory.

The apparatus draws each bit map pattern in a tiled pattern. Therefore, the apparatus calculates By using the expression as follows.

$$By=(Py\% Bh)+Byoffset$$

where % expresses a remainder, Bh expresses a height of the bit map pattern, and Byoffset expresses an offset corresponding to the origin P=(0, 0) in the page memory. To simplify the explanation, it is assumed that Byoffset=0, that is, the bit map pattern B corresponding to the origin of the page memory is also (0, 0), and that the bit map pattern is bedded in a tiled pattern starting from the origin of the page memory.

This calculation expression is applied to the example of FIG. 2. As the pixels S1, S2, and S3 are in the drawing range, By becomes equal to 2 (i.e., the third row), based on Py=5 and the height Bh=3 for the bit map pattern. At the subsequent steps, the apparatus sequentially carries out the processing starting from the minimum value 5 to the maximum value 10 of Py of all the graphic coordinates P in the sub-scanning Y axis direction.

The apparatus stores a starting point X coordinate Px of the main scanning line of the pixel S, as Psx, and stores BLT [Bl, By] of the BLT value of B1 corresponding to the concentration L of the pixel S, as Bs (step 2). Psx becomes a starting point of the drawing range at step 5 to be described later. Bs becomes a value to be compared at the time of searching for the pixel S having the same BLT value at steps 3 and 4. The processing at step 2 will be applied to the example shown in FIG. 2. When the pixel S is the starting pixel S1 in FIG. 2, the starting X coordinate on Py=5 is Px=5. Therefore, the apparatus stores 5 as Psx. The BLT value corresponding to the concentration L1 of S1 is the third row of B1, that is, BLT [1, 2]=0. Therefore, the apparatus store 0 in Bs.

The apparatus stores the X coordinate Px at the end point of the pixel S processed at step 2, as Pex, and proceeds to the processing of the next pixel S (step 3). Pex becomes an end point of the drawing range at step 5 to be described later.

The apparatus checks whether the new pixel S to be processed next is adjacent to the preceding pixel S, and also whether the BLT value of this pixel S is the same as Bs of the BLT value of the preceding pixel S (step 4). The apparatus decides whether the coordinate value "Pex+1" that is next to the end point X coordinate Pex of the preceding pixel is the same as the starting point X coordinate of the pixel S to be processed. Based on this decision, it is possible to decide whether the new pixel S is adjacent to the preceding pixel S. When it is decided that both X coordinates are the same and also when it is decided that both BLT values are the same (Yes at step 4), it is possible to decide that the apparatus can use the same pattern for the adjacent pixel. Therefore, the apparatus can do batch process of drawing these pixel ranges. When it is decided at step 4 that it is possible to use the same pattern for the adjacent pixel (Yes at step 4), the apparatus repeatedly carries out the processing at steps 3 and 4 to the next pixel S.

As a result of the processing at steps 3 and 4 of searching for the adjacent pixel S having the same BLT value in the example shown in FIG. 2, the apparatus confirms that all the pixels S1, S2, and S3 are adjacent. It is general that pixels are usually adjacent in the data row of a picture image. Since the line of Py=5 uses the third row of the row pattern, BLT [1, 2]=BLT [2, 2]=0. BLT [3, 2]=3. Therefore, when the pixel processed at step 4 is S2, the process returns to the processing at step 3. When the pixel processed at step 4 is S3, the process proceeds to the processing at step 5. Pex is the end point X coordinate of the pixel S2 that is processed last at step 3. Therefore, Pex becomes equal to 14. Bs is the BLT value of the pixel S1 that is processed last at step 2. Therefore, Bs remains 0.

Next, the apparatus draws the adjacent pixels S having the same BLT value, using the bit map pattern of Bs, from Psx to Pex (step 5). In other words, Psx is stored at step 2 as the starting point X coordinate of the first pixel S having the BLT value as Bs. Pex is stored at step 3 as the end point X coordinate of the last pixel S having the same BLT value as Bs. Therefore, the X coordinate range to be batch drawn by Bs is made firm at this point of time. The line corresponding to By of Bs (i.e., the row data of the 3 dots in the example shown in FIG. 3) is drawn repeatedly from Psx to Pex. It is necessary to calculate Bsx and Bex corresponding to the starting point Psx and the end point Pex respectively. It is possible to similarly apply the method used to calculate By in the Y coordinate direction at step 1. In other words, it is possible to use the following calculation expression.

$$Bx=(Px\% Bw)+Bxoffset$$

where % expresses a remainder, Bw expresses a width of the bit map pattern, and Bxoffset expresses an offset corresponding to the origin P=(0, 0) of the page memory.

This calculation expression is applied to the example of FIG. 2. As the pixels S1 and S2 are to be drawn simultaneously based on Py=5, Psx becomes equal to 5, and Pex becomes equal to 14. To simplify the explanation like at step 1, it is assumed that Bw is equal to 3, the origin offset is 0, and Bxoffset is equal to 0. Then, Bsx becomes equal to 2, and Bex becomes equal to 2. Based on this result, Bx from Psx to Pex of the drawing range is expressed using (Px, Bx) as follows:

(5, 2), (6, 0), (7, 1), (8, 2), (9, 0), (10, 1), (11, 2), (12, 0), (13, 1), (14, 2).

The apparatus carries out the drawing by repeating each 3 dots based on the above combination. In the patterns shown in FIG. 3, Bs becomes the BLT value=0 of the pixel S1, and the third row of B0 has all white dots. Therefore, there is no change in the array depending on Bx. However, in the case of the row pattern of white and black dots, a change occurs in the array depending on Bx.

After the apparatus ends one unit of the drawing processing of the Bs bit map pattern from Psx to Pex based on the above batch drawing method, the apparatus checks whether the apparatus has ended the processing of all the lines without an unprocessed pixel (step 6). When the pixel S has not exceeded the last pixel, that is, when there is an unprocessed pixel (No at step 6), the process returns to step 2. The apparatus repeats the processing at step 2 to step 6 until when all the pixels in one line have been processed. When the pixel S has exceeded the last pixel (Yes at step 6), the process proceeds to step 7.

When the apparatus confirms the end of the drawing processing of all the pixels of one line, the apparatus updates Py to the next Py to proceed to the processing of the next line (step 7). In the example shown in FIG. 2, the apparatus updates Py to Py=6 by adding 1 to the current Py.

Next, the apparatus checks whether the processing of the whole drawing range in the sub-scanning Y axis direction has ended, based on the Py value updated at step 7 (step 8). It is possible to carry out this checking by deciding whether the updated Py value exceeds the maximum Py value of the whole drawing image. In the example shown in FIG. 2, when the updated Py does not exceed the maximum Py value 10 of the drawing image (No at step 8), the process returns to step 1, and the apparatus carries out the drawing processing of the next line. When the updated Py exceeds the maximum Py value 10 of the drawing image (Yes at step 8), the total processing has ended. Therefore, the drawing processing flow ends.

While the number of dot-gradation expression bits is explained as one bit/one dot in the present embodiment, it is also possible to obtain similar effects when two bits, four bits, or eight bits are used per one dot.

Further, in the present embodiment, while the origin coordinates (Boffsetx, Boffsety) are assumed as (0, 0) to draw the bit map patterns in the page memory, it is also possible to assign optional coordinates, and start drawing from this point.

A second embodiment of the present invention is similar to the first embodiment in that the BLT is introduced to carry out the batch drawing processing thereby to improve the efficiency of the repetitive writing of the same bit map pattern. However, the second embodiment is different from the first embodiment in that the number of times of accessing the patterns at the writing time is decreased thereby to improve the processing efficiency. Therefore, in the present embodiment, a word boundary pattern is used instead of the method of writing the same pattern by shifting this pattern that is employed in the first embodiment. The word boundary pattern is a linked pattern of a plurality of basic bit map patterns prepared in advance. An output apparatus uses this word boundary pattern to carry out a batch drawing processing. The length of the linked pattern is set the same as the length of the word boundary, thereby to avoid a disconnection of patterns at the word boundary.

Figure 6:
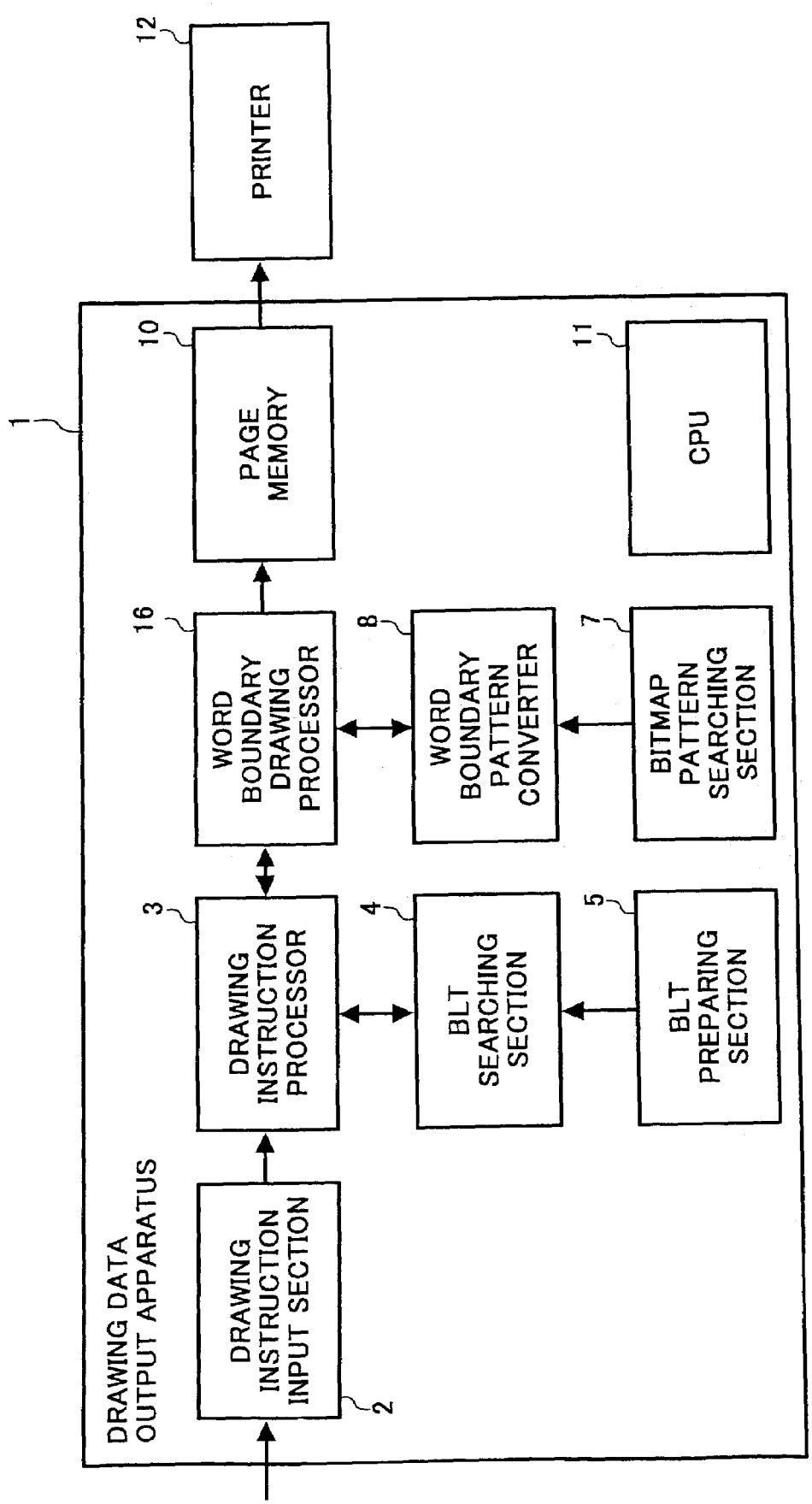
FIG. 6 shows a schematic structure of an image output apparatus according to a second embodiment of the present invention.

FIG. 6 shows a schematic structure of an image output apparatus according to the second embodiment. The image output apparatus consists of the drawing data output apparatus 1, and the printer 12. The drawing data output apparatus 1 includes the drawing instruction input section 2, the drawing instruction processor 3, the BLT searching section 4, the BLT preparing section 5, a word boundary drawing processor 16, the bit map pattern searching section 7, a word boundary pattern converter 8, the page memory 10, and the CPU 11.

The outline operation of the image output apparatus shown in FIG. 6 will be explained below based on the flow of the drawing processing. A graphic drawing instruction to draw image data is input to the drawing data output apparatus 1. The drawing instruction input section 2 receives this graphic drawing instruction, interprets the drawing data based on the input instruction, obtains a drawing expressed as a set of a drawing range and a concentration, as a result of the interpretation, and passes the drawing to the drawing instruction processor 3.

The drawing instruction processor 3 checks Y coordinate ranges in a sub-scanning direction included in the whole received pixels, and rearranges the whole pixels included in each Y coordinate in the X coordinate. The drawing instruction processor 3 inputs the Y coordinate to be drawn and the concentration of each pixel (where the drawing range is indicated in the X coordinate) to the BLT searching section 4. The BLT searching section 4 obtains a concentration having the same bit map pattern as the input concentration within the input Y coordinate (i.e., on the main scanning line), by using the BLT prepared in advance by the BLT preparing section 5. The BLT searching section 4 returns the obtained concentration to the drawing instruction processor 3.

The drawing instruction processor 3 calculates all the X coordinate ranges of adjacent pixels of which concentrations are the same as the concentration that the BLT searching section 4 has obtained. The drawing instruction processor 3 passes the obtained X coordinate ranges and the concentration to the word boundary drawing processor 16.

The word boundary drawing processor 16 inputs the received concentration to the bit map pattern searching section 7 via the word boundary pattern converter 8. The bit map pattern searching section 7 obtains the bit map pattern, and instructs the word boundary pattern converter 8 to prepare the word boundary bit map pattern corresponding to the concentration based on the obtained bit map pattern. The CPU 11 processes the page memory 10, by using the word boundary bit map pattern that the word boundary pattern converter 8 prepared, the concentration and the X coordinate ranges received from the drawing instruction processor 3, and the corresponding contents in the page memory 10. The word boundary drawing processor 16 changes the page memory 10 based on a result of the processing carried out by the CPU 11.

When the word boundary drawing processor 16 completes the writing of all the lines into the page memory 10, the CPU 11 issues an end of drawing instruction or an output instruction to the output apparatus. Based on this instruction, the output apparatus outputs the contents of the page memory 10 to the printer 12.

The word boundary pattern conversion (i.e., preparation) that the word boundary pattern converter 8 carries out will be explained in detail below.

Figure 7:
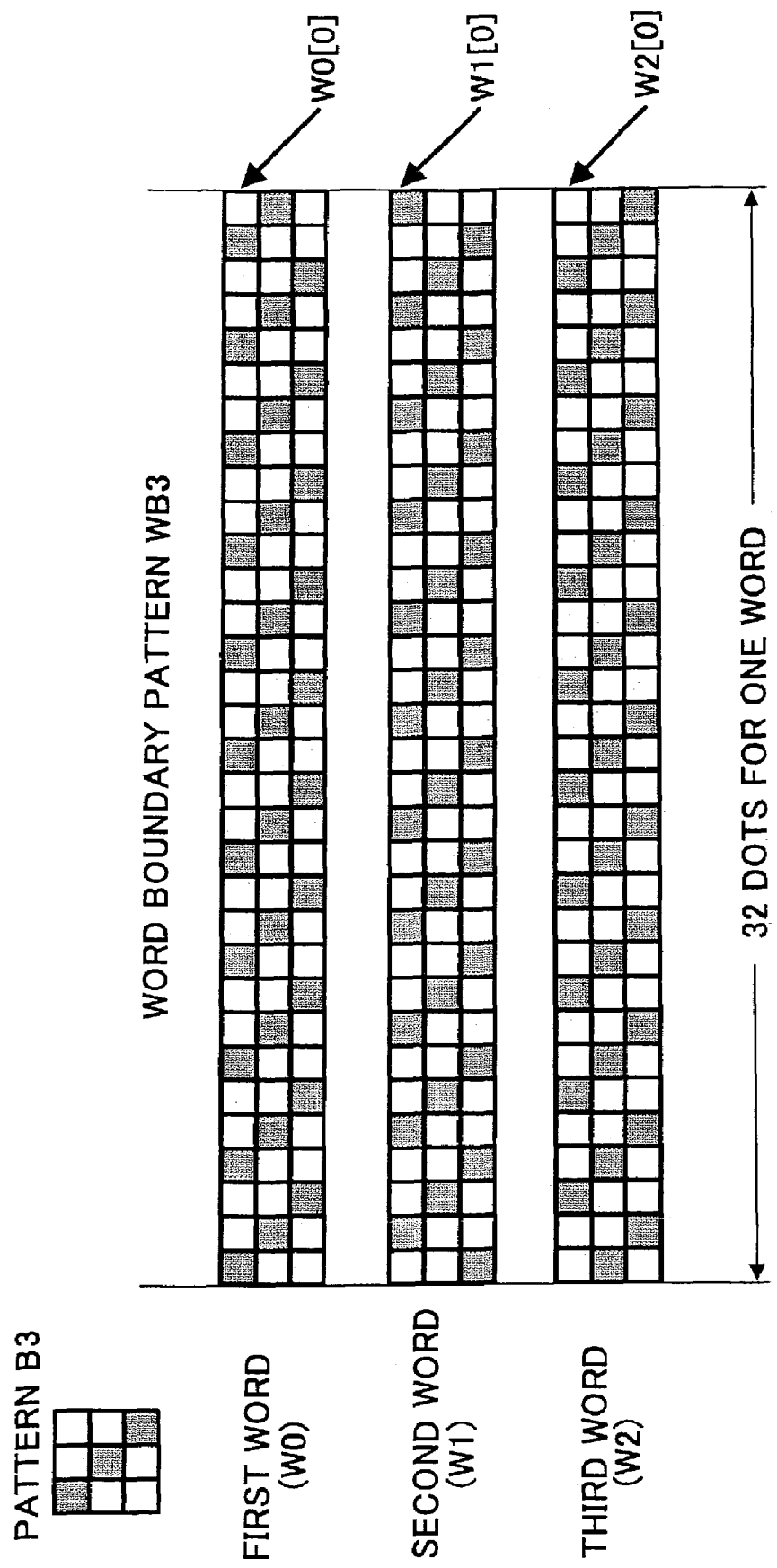
FIG. 7 shows one example of a word boundary pattern according to the second embodiment of the present invention.

FIG. 7 shows one example of a basic bit map pattern and a word boundary pattern according to the second embodiment. The word boundary pattern preparation processing that the word boundary pattern converter 8 carries out will be explained with reference to FIG. 7.

In the second embodiment, the input drawing, the bit map pattern corresponding to the concentration (i.e., the basic pattern), and the BLT are the same as those used in the first embodiment. In other words, the input drawing is based on that shown in FIG. 2, the basic bit map pattern is based on the bit map pattern shown in FIG. 3, and the BLT is based on that shown in FIG. 4.

In the second embodiment, one word employs 32 dots. The basic bit map pattern has the width Bw of 3 (refer to FIG. 3). A plurality of the same basic bit map patterns are arrayed to prepare a word boundary pattern. It is necessary to prepare this word boundary pattern such that the pattern is not disconnected in the middle. For this purpose, a least common multiple of the pattern width and the word length (i.e., the number of dots) is employed. Therefore, the word boundary pattern in this example has three words including 96 dots as the least common multiple of Bw=3 and the word length=32.

FIG. 7 shows a pattern actually obtained by applying the above rule to the bit map pattern B3. It is possible to lay out an integer number of the basic bit map patterns by repeating the bit map pattern B3 for the first word, the second word, and the third word. Each row pattern of the word boundary pattern consisting of three words is expressed as the repetition of W (the word order number-1). In the example shown in FIG. 7, the word boundary pattern of the first row (By =0) pattern of the bit map pattern B3 becomes the repetition of W0 [0], W1 [0], and W2 [0]. The word boundary patterns of the second and third rows become W0[1],W1[1],W2[1], and W0[2], W1[2], W2[2], respectively. All the nine words constisting of the first to the third rows, having a width of 96 dots and the height of 3 dots, are stored in the memory area of the continous address as a word boundary pattern WB3 of the pattern B3.

The word boundary pattern prepared in this way is a minimum unit of the repetition of the words of the original bit map pattern. In other words, when this word boundary pattern is drawn in a tiled pattern, it is possible to obtain the same result as that obtained when the original bit map pattern (refer to FIG. 3) is drawn by bedding. As it is possible to use the word boundary pattern straight in the word unit, it is possible to avoid or reduce the shift processing that is necessary to repetitively bed the original bit map pattern into the page memory like in the first embodiment.

It is possible to draw the image using the word boundary pattern, by applying basically the same batch drawing processing flow (refer to FIG. 5) as that used in the first embodiment.

At step 5 shown in the process flow of FIG. 5, when the apparatus batch draws the adjacent pixels S of the same BLT value using the bit map pattern Bs into the range from Psx to Pex, the apparatus uses the word boundary pattern instead of the basic pattern as the bit map pattern to be filled into the page memory.

Therefore, the calculation of the coordinates Bsx and Bex of the bit map patterns corresponding to the X coordinate range from Psx to Pex to be batch drawn becomes the calculation of specifying the coordinates that define the word boundary pattern stored in the memory area of the continuous address. When the word boundary pattern is used, the apparatus specifies the coordinates in the word unit (i.e., 96 bits in the example shown in FIG. 7). Therefore, it is possible to simplify the processing by reducing the shift processing compared to that required to specify the construction unit (i.e., three dots in the example shown in FIG. 5) of the basic pattern.

While 32 bits are used per word in the present embodiment, it is also possible to use 16 bits or 64 bits per word.

A third embodiment according to the present invention relates to the improvement of the second embodiment where the BLT is introduced to carry out the batch drawing and the same bit map pattern is repeated in the word unit thereby to increase the processing efficiency. In the third embodiment, a cache memory that stores the prepared word boundary pattern, and a managing unit that manages the word boundary pattern stored in this cache memory, are provided to achieve the improvement. In the second embodiment, the re-use of a once-prepared word boundary pattern is not taken into account. However, in the third embodiment, the cache memory stores and manages the once-prepared word boundary pattern, thereby to omit the preparation of the same pattern for the subsequent drawing processing. Based on this, it is possible to quickly carry out the drawing of the same pattern, thereby to increase the processing speed.

Figure 8:
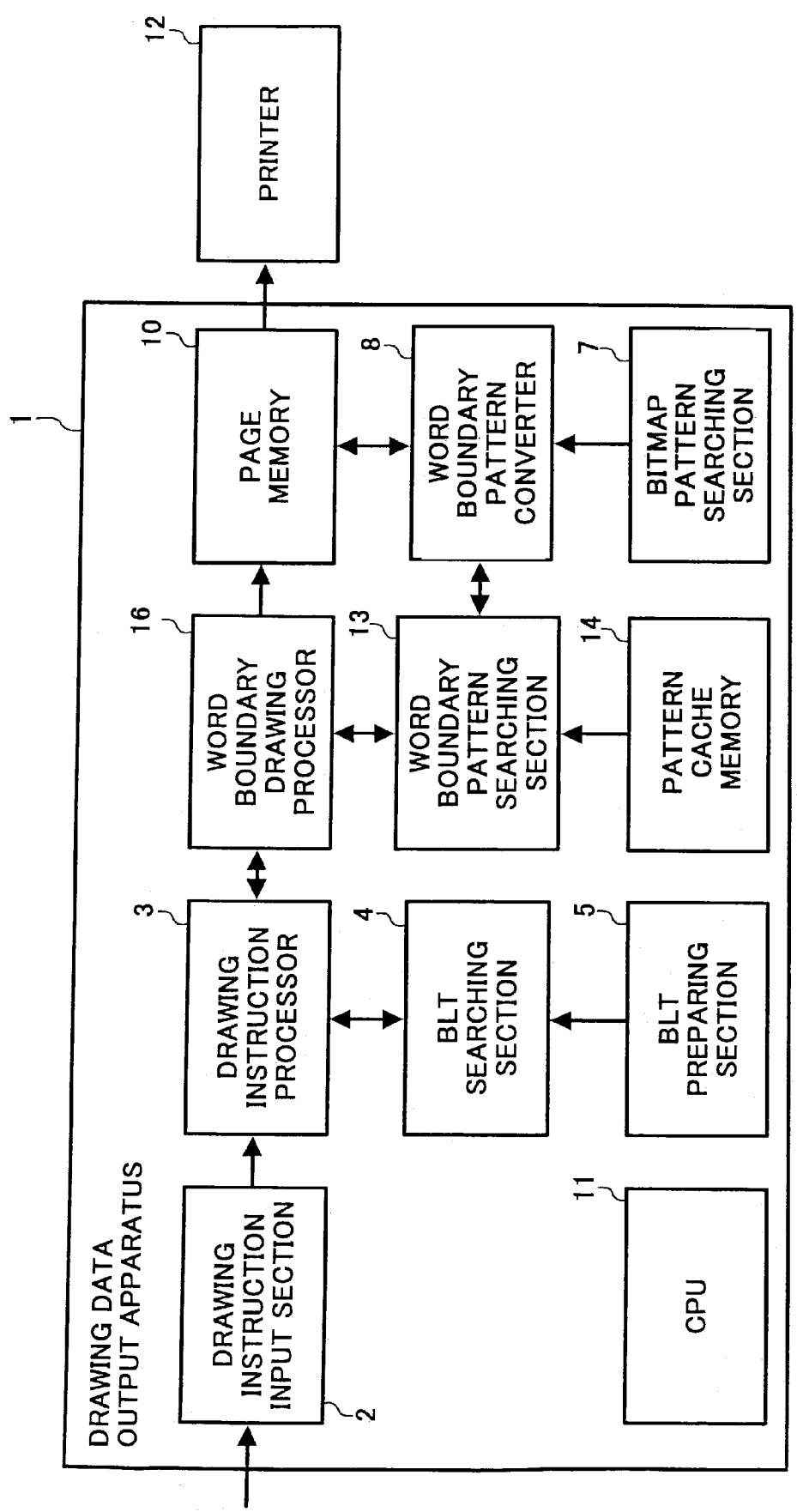
FIG. 8 shows a schematic structure of an image output apparatus according to a third embodiment of the present invention.

FIG. 8 shows a schematic structure of an image output apparatus according to the third embodiment. The image output apparatus consists of the drawing data output apparatus 1, and the printer 12. The drawing data output apparatus 1 includes the drawing instruction input section 2, the drawing instruction processor 3, the BLT searching section 4, the BLT preparing section 5, the word boundary drawing processor 16, the bit map pattern searching section 7, the word boundary pattern converter 8, a word boundary pattern searching section 13, a pattern cache memory 14, the page memory 10, and the CPU 11.

The outline operation of the image output apparatus shown in FIG. 8 will be explained below based on the flow of the drawing processing. A graphic drawing instruction to draw image data is input to the drawing data output apparatus 1. The drawing instruction input section 2 receives this graphic drawing instruction, interprets the drawing data based on the input instruction, obtains a drawing expressed as a set of a drawing range and a concentration, as a result of the interpretation, and passes the drawing to the drawing instruction processor 3.

The drawing instruction processor 3 checks Y coordinate ranges in a sub-scanning direction included in the whole received pixels, and rearranges the whole pixels included in each Y coordinate in the X coordinate. The drawing instruction processor 3 inputs the Y coordinate to be drawn and the concentration of each pixel (where the drawing range is indicated in the X coordinate) to the BLT searching section 4. The BLT searching section 4 obtains a concentration in the same bit map pattern as the input concentration within the input Y coordinate (i.e., on the main scanning line), by using the BLT prepared in advance by the BLT preparing section 5. The BLT searching section 4 returns the obtained concentration to the drawing instruction processor 3.

The drawing instruction processor 3 calculates all the X coordinate ranges of adjacent pixels of which concentrations are the same as the concentration that the BLT searching section 4 has obtained. The drawing instruction processor 3 passes the obtained X coordinate ranges and the concentration to the word boundary drawing processor 16.

In the word boundary drawing processor 16, the word boundary pattern searching section 13 checks whether the word boundary pattern is already stored in the pattern cache memory 14, using the received concentration and the Y coordinate position By of the bit map pattern B obtained from the BLT as searching keys.

When the word boundary pattern is already stored in the pattern cache memory 14, the word boundary pattern searching section 13 returns this word boundary pattern to the word boundary drawing processor 16. When the word boundary pattern is not yet stored in the pattern cache memory 14, the word boundary drawing processor 16 inputs the received concentration to the bit map pattern searching section 7 via the word boundary pattern converter 8. The bit map pattern searching section 7 obtains the bit map pattern, and instructs the word boundary pattern converter 8 to prepare the word boundary bit map pattern corresponding to the concentration based on the obtained bit map pattern. The apparatus prepares the word boundary bit map pattern in a similar processing to that of the second embodiment.

The CPU 11 processes the page memory 10, based on the word boundary bit map pattern obtained from the cache memory 14 or generated by the word boundary pattern converter 8, the concentration and the X coordinate ranges received from the drawing instruction processor 3, and the corresponding contents in the page memory 10. The word boundary drawing processor 16 changes the page memory 10 based on a result of the processing carried out by the CPU 11.

When the word boundary drawing processor 16 completes the writing of all the lines into the page memory 10, the CPU 11 issues an end of the drawing instruction or an output instruction to the output apparatus. Based on this instruction, the output apparatus outputs the contents of the page memory 10 to the printer 12.

The pattern searching and the management that the word boundary pattern searching section 13 carries out will be explained in detail below.

The word boundary pattern searching section 13 can take different methods of a pattern searching method, a registration method, and an abandoning method, depending on the cache algorithm. In the present embodiment, a simple table that does not take into account the reference frequency is used. As the registration method, a method based on the pointer management of a monotonous increase is used. It is of course possible to use other high-level cache algorithm.

Figure 9:
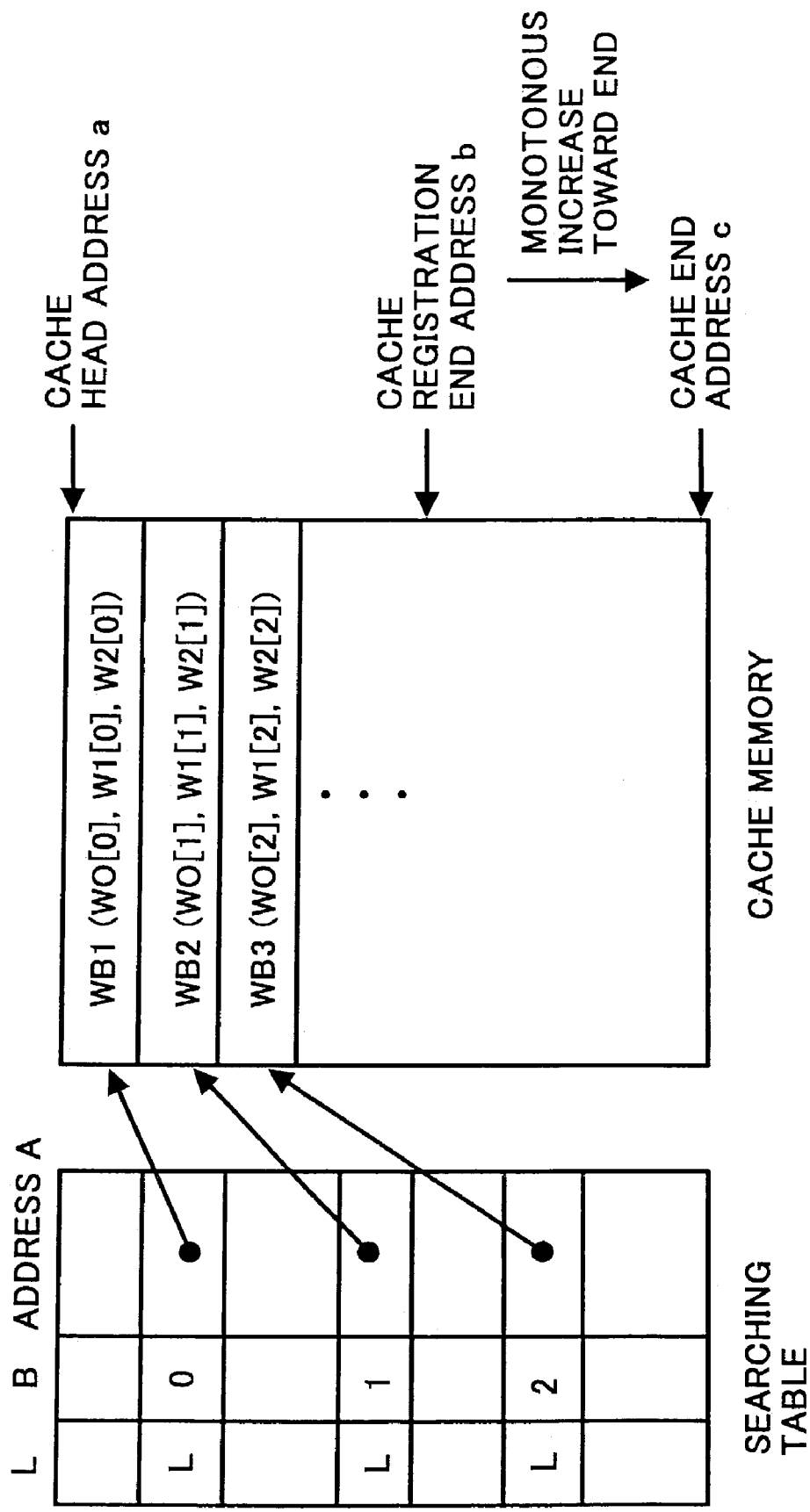
FIG. 9 explains about a cache system according to a third embodiment of the present invention.

Therefore, in the present embodiment, the cache system uses a searching table, and a cache memory as shown in FIG. 9. The searching table has addresses to the cache memory, by using a combination of the concentration L and the Y coordinate By of the bit map pattern, as a searching key. The cache memory is one continuous memory. A cache head address "a" is specified in advance, and its size (i.e., a difference between the cache rearmost address "c" and the cache head address "a") is also specified in advance. By managing patterns based on an indirect reference according to the address, it is possible to register an optional word boundary pattern.

When the searching is instructed by using L and By as keys, the word boundary pattern searching section 13 searches for an address to the cache memory with reference to the searching table. The searching table may have the whole patterns or a part of the patterns of L and By. When the searching table has the whole patterns, it is possible to hold the table as one attribute of the BLT instead of holding it as an independent table. For example, in the BLT shown in FIG. 4, there are five kinds of bit map patterns B (corresponding to the concentration L), and there are three kinds of By. Therefore, the searching table has 15 addresses. In this case, when the BLT value is checked, it is also possible to obtain the address to the cache memory at the same time. Consequently, it is possible to avoid the searching work. When there are many kinds of bit map patterns, and also when there is a limit to the memory capacity, it takes time for the searching. Therefore, the searching table may hold a part of the patterns.

As a result of the searching, when a valid address exists in the address section of the searching table, this means that the pattern already exists in the cache memory. Therefore, the word boundary pattern searching section 13 directly returns this address as a return value. When there is an invalid address (such as zero) in the address section, this means that the pattern is not registered yet. Therefore, in this case, the word boundary pattern converter 8 prepares the pattern, and registers the prepared pattern into the cache memory.

In the registration processing, the word boundary pattern searching section 13 stores the cache registration end address "b" into the portion of the invalid address in the searching table, and returns the address. The word boundary pattern searching section 13 increases the end address "b" by the size of the registration. At the time of this registration. the word boundary pattern searching section 13 checks whether the size to be registered will overflow from the cache memory, based on the difference between the cache registration end address "b". the cache end address "c" and a size registered therefrom. When the size overflows from the cache memory, the word boundary pattern searching section 13 clears the cache memory. In the present embodiment, a monotonous incremental address without frequency information is used. Therefore, when the size overflows from the cache memory, all the registered contents are cleared. In this case, the word boundary pattern searching section 13 changes all the address section of the searching table to the invalid address, and replaces the cache registration end address "b" with the value of the cache head address "a".

As explained above, by using the word boundary pattern extracted from the pattern cache memory 14, it is possible to draw by repeating the writing in the word unit without shifting the pattern using the basic pattern as a unit, like in the second embodiment.

In the third embodiment, the word boundary pattern converter 8 generates the word boundary bit map pattern corresponding to the concentration, when the pattern is not registered in the cache memory as a result of the searching that the word boundary pattern searching section 13 has carried out. However, when all the word boundary bit map patterns are registered corresponding to all the concentrations, it is possible to omit the word boundary pattern converter 8.

In a fourth embodiment according to the present invention, the bit map pattern corresponding to the concentration L, and the BLT introduced to carry out the batch drawing processing in the present invention, will be explained.

When a graphic drawing instruction is input to fill the specified range in the page memory using a specified concentration, the image output apparatus draws the image by filling the specified range in a tiled pattern with the bit map pattern using the specified concentration. The apparatus uses dither patterns (refer to FIG. 3) as the bit map patterns, in the same manner as explained in connection with the first to third embodiments. There are various kinds of dither patterns. In the fourth embodiment, a dither pattern is prepared for each kind of pixels such as a character, a graphic, and an image to be drawn. The apparatus has a unit that changes over the prepared plurality of kinds of dither patterns corresponding to the kinds of the pixels indicated by the drawing instruction. Based on this, the apparatus carries out the drawing using suitable patterns. It is possible to use an existing unit for this changeover unit.

The dither patterns may be provided to cover all the patterns required as the bit map patterns. However, this method requires a large-capacity memory. Therefore, in order to reduce the memory capacity, a threshold value table is prepared in advance as an order table. A pattern corresponding to the concentration to be used is prepared based on the threshold value table. The threshold value table has different values corresponding to the kinds of the dither patterns.

The BLT to be used for the batch drawing processing is prepared based on the dither patterns as described in the first embodiment. It is possible to obtain the BLT directly from the threshold value table that becomes the basis of the dither patterns. Therefore, it is possible to process both the dither patterns and the BLT. As it is possible to obtain the BLT directly from the threshold value table, it becomes easier to obtain the BLT in this way than to obtain the BLT from the dither patterns. The BLT preparing section 5 carries out the above processing in the present embodiment.

Figure 10B:
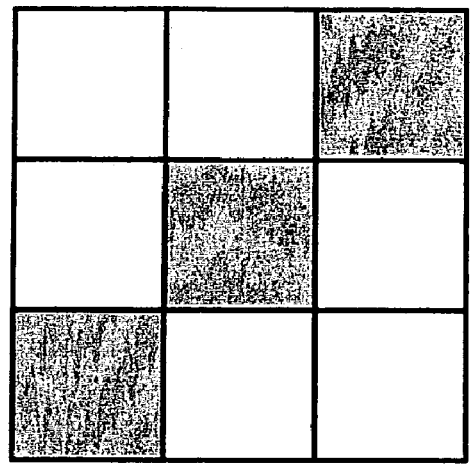
FIG. 10A and FIG. 10B show examples of a threshold value (order) table and a dither pattern according to a fourth embodiment of the present invention.
Figure 10A:
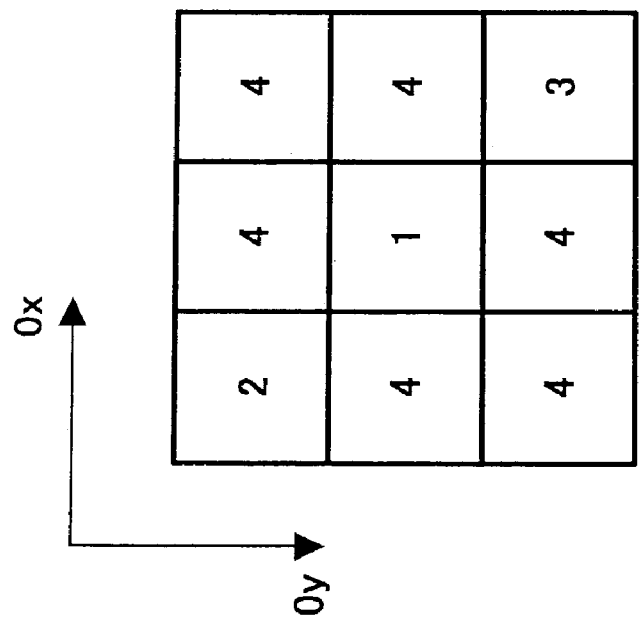

FIG. 10A and FIG. 10B show examples of a threshold value table and a dither pattern according to the fourth embodiment. FIG. 10A shows an example of a threshold value table that is used when five stages from 0 to 4 are used as concentrations. A pixel having a concentration higher than a specified concentration L becomes ON. Other pixels become OFF. When the concentration L=3 is specified based on the table shown in FIG. 10A, the dither pattern shown in FIG. 10B is obtained. The threshold value table exemplified in FIG. 10A shows the threshold values of one of the dither patterns shown in FIG. 3. FIG. 10B shows the bit map pattern B3 corresponding to L3 shown in FIG. 3. It is obvious that it is possible to obtain all the dither patterns shown in FIG. 3 when L=0 to L=4 are applied.

A method of preparing the BLT based on the threshold value table shown in FIG. 10A will be explained. An optional row Oy of the threshold value table is looked at. The apparatus sorts O [x, y] of all the columns (O≦Ox≦2) from a low value to a high value, including the minimum concentration (L=0) and the maximum concentration (L=4). The apparatus disregards the same value. The apparatus sets the BLT value of [La, Lb] (not including Lb), with the adjacent values expressed as La and Lb and both ends, as La (a smaller value). For example, when the apparatus sorts the values 2, 4, and 4 in the first row including 0 and 4 (by disregarding the same value), the sorted result becomes 0, 2, and 4. Therefore, the BLT value of L=0, 1 becomes 0. The BLT value of L=2, 3 becomes 2. The BLT value of L=4 becomes 4. As a result, the table values (0, 0, 2, 2, 4) in the first row of the BLT shown in FIG. 4 are obtained. The apparatus repeats a similar operation for all the rows (i.e., the first to the third rows).

It is also possible to obtain the BLT values based on the following method without using the sorting. An optional row Oy of the threshold value table is looked at. The apparatus changes the concentrations L from the minimum concentration (L=0) to the maximum concentration (L=4), and compares a certain concentration L with O [x, y] of all the columns (0≦Ox≦2). The apparatus prepares Lmin for registering the BLT value. The initial value of Lmin is the minimum concentration (L=0). When there is at least one O [x, y] that is the same value as this L, this L is set as Lmin. The Lmin at this point of time is set as the BLT value corresponding to this L, regardless of presence or absence of the same value. For example, assume that the first row of FIG. 10A is started from L=0, that is, Lmin=0. All the columns have values different from the L. Therefore, the Lmin value 0 enters straight in BLT [0, 0]. Similarly when L=1, 0 enters in BLT [1, 0]. When L=2, the same value (O [0, 0]) exists, and, therefore, Lmin becomes 2, and 2 enters in BLT [2, 0]. When L=3, there is no same value, and, therefore, the Lmin value 2 enters. When L=4, there is the same value, and, therefore, Lmin becomes 4, and 4 enters in BLT [4, 0].

It is possible to obtain a unique dither pattern based on a unique threshold value table. It is also possible to obtain a unit BLT based on this unique dither pattern. The dither patterns obtained based on FIG. 10A are those shown in FIG. 3. The BLT shown in FIG. 4 is obtained based on FIG. 3. Then, it is clear that the BLTs obtained from the above two calculation methods based on FIG. 10A are the same as the BLT shown in FIG. 4.

In the fourth embodiment, an example of a small concentration gradation is explained. It is also possible to apply similar methods corresponding to each of 0 to 255 gradations expressed in eight bits as specified concentrations. When the specified concentration is a color concentration for Cyan, Magenta, Yellow, and blacK (i.e., CMYK) generally used for a color printing, it is possible to apply each dither pattern corresponding to each of the CMYK to express a pseudo gradation. When methods similar to those explained in the present embodiment are used, it is also possible to carry out the drawing processing of a color printing.

In a fifth embodiment according to the present invention, in order to increase the drawing processing speed, the same bit map pattern is batch drawn into adjacent specified drawing ranges to which the same bit map pattern can be applied, using still another process. When the specified concentration in the specified drawing range is the same as a condition for the batch processing, the image output apparatus carries out, with priority, the batch drawing into the corresponding range using the same concentration. Based on this, it is possible to further increase the processing efficiency, from the above embodiments of using the BLT.

Figure 11:
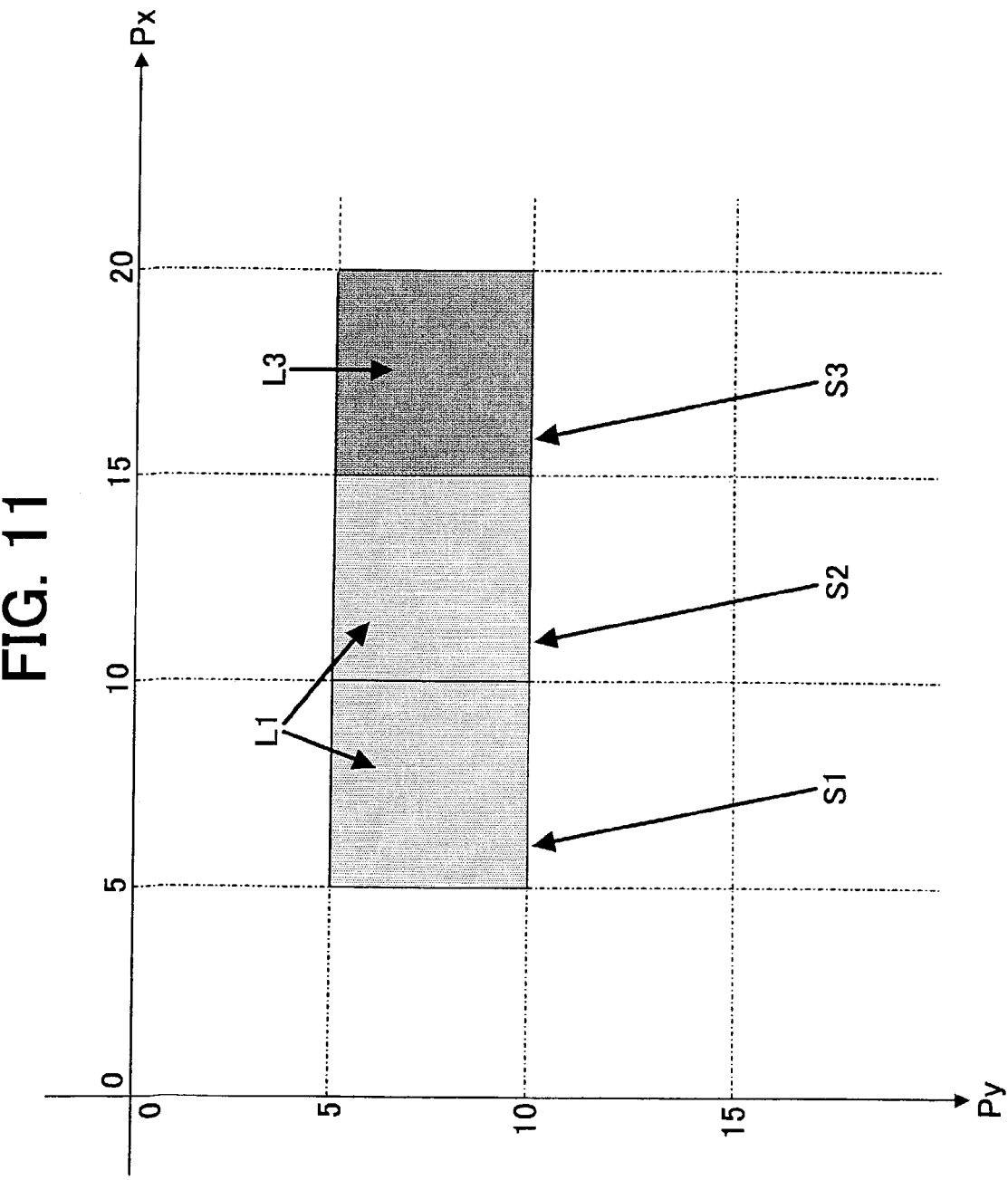
FIG. 11 is an explanatory diagram of input pixels S1, S2, and S3 (with corresponding concentrations L1 and L3) to be drawn according to a fifth embodiment of the present invention.

The input drawing (i.e., the graphic drawing instruction) to which the processing according to the present embodiment is applied will be explained using an example shown in FIG. 11. FIG. 11 shows the input pixels in a similar manner to that shown in FIG. 2 in the first embodiment. FIG. 11 shows the drawing processing with the same concentration L1 in the pixels S1 and S2. In the first embodiment (refer to FIG. 2), the apparatus obtains the BLT values (refer to FIG. 4) based on the concentration B of each pixel, and the drawing y coordinate. When the BLT values are the same, the apparatus carries out the batch drawing. In the first embodiment, the apparatus carries out the batch processing of adjacent pixels having different concentrations L1, L2, and L3. On the other hand, in the fifth embodiment, the adjacent pixels have the same concentrations. When the concentrations are the same, it is not necessary to check whether the BLT values are the same. It is clear that all the BLT values are the same in all the y coordinates included. The apparatus carries out the processing based on this condition.

To execute the above processing, first, the apparatus compares concentrations. When the concentrations are the same, the apparatus carries out the batch drawing processing at a stage before checking the BLT values. As the concentrations of the pixels S1 and S2 are the same L1 in FIG. 11, the apparatus carries out the batch drawing of the pixels S1 and S2. The next pixel S3 following the pixels S1 and S2 has the concentration L3, which is different from L1. In this case, the apparatus obtains the BLT value, and determines a range that can be batch drawn, like in the first embodiment. When the BLT values obtained for the concentration L3 of the pixel S3 and the concentration L1 of the pixel S1 are the same, the apparatus can carry out the batch drawing of the range including the pixels S1, S2, and S3. When the obtained BLT values are different, the apparatus draws the portion of the pixels S1 and S2 using the bit map of the concentration L1, and draws the pixel S3 using the bit map of the concentration L3.

As explained above, the apparatus first compares concentrations and decides whether the concentrations (color concentrations) of the pixels are the same. Based on this, it is possible to omit the calculation of the BLT values.

In the above processing of comparing the specified concentrations and carrying out the batch drawing with priority based on a result of this comparison, an embodiment of the drawing processing when a clip is set will be explained next.

Figure 12:
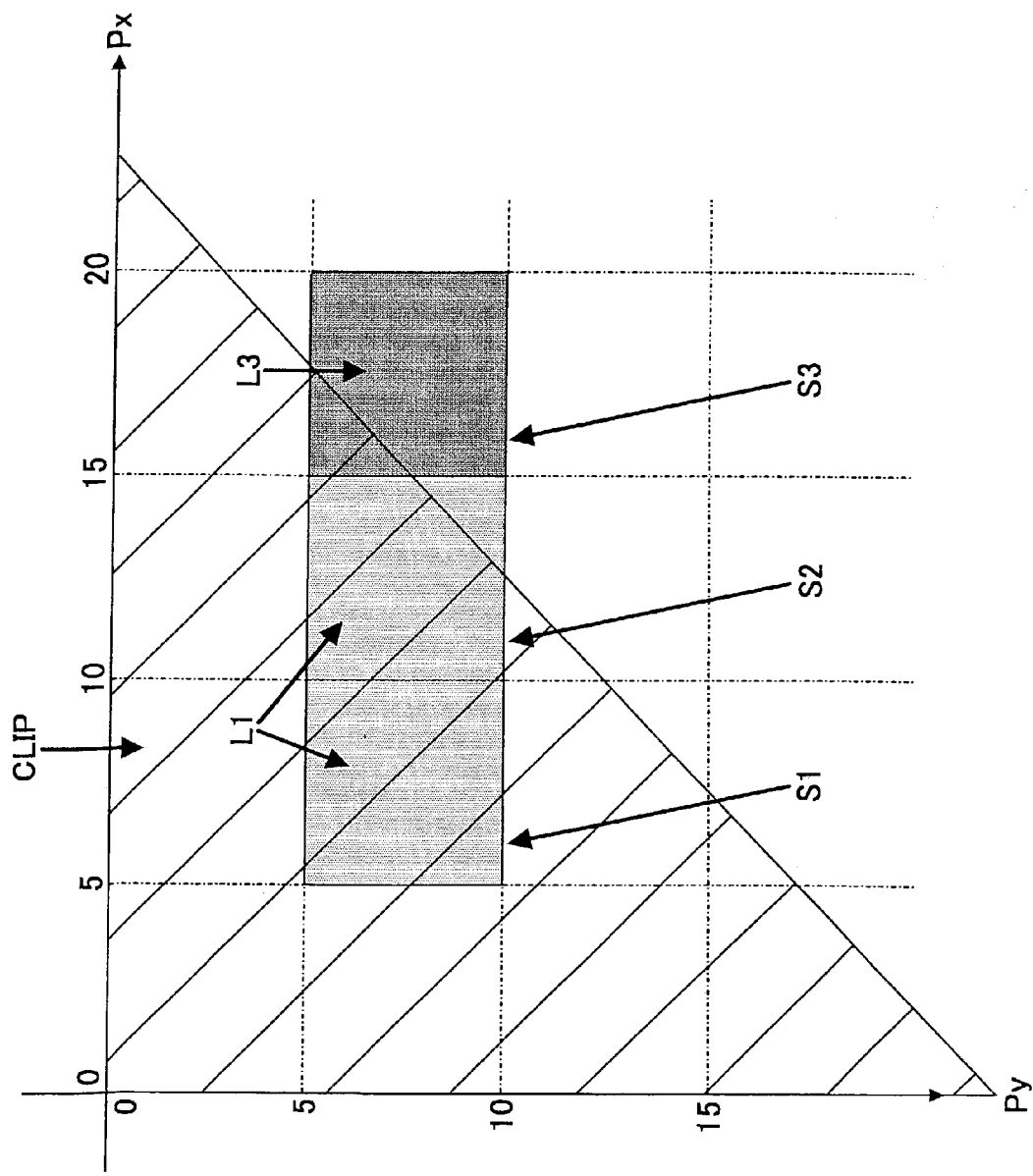
FIG. 12 explains about a drawing processing when a clip is set to the drawing shown in FIG. 11.

FIG. 12 shows that an optional clip area is specified in the image. In this example, the apparatus draws only a triangular portion that is hatched as a clip area. When such a clip area is set, the apparatus carries out the drawing processing while deciding whether the pixel that is to be drawn now is within the clip area or outside the clip area. For example, when the apparatus draws in the main scanning (X axis) direction at y=5, and when the clip X range is [0, 17], the pixel S1 is within the clip range, the pixel S2 is within the clip range, and the portion [15, 17] of the pixel S3 is within the clip range. The portion [18, 19] of the pixel S3 is outside the clip range. The apparatus carries out the drawing while making the above decision for each pixel. According to this method, it is necessary to decide about the clip range for each pixel. The apparatus requires a non-negligible load to carry out this decision when the picture image has a large number of pixels.

To cope with this situation, the apparatus carries out the clip range decision processing based on a unit that is specified as a batch drawing range of the same concentration using the same bit map pattern as explained with reference to FIG. 11. Based on this, it is possible to reduce the load of the clip range decision processing, and it is possible to shorten the processing time.

The present invention is not limited to the above embodiments, and it is also possible to execute the operation by suitably modifying the operation within a range not deviating from the gist of the present invention.

The first, second, eighteenth, nineteenth, and twenty-fourth aspects of the present invention provide following effects:

The apparatus decides whether the bit map pattern to be used in the adjacent specified drawing ranges is the same (by utilizing the BLT in which the same concentration is referred to). Based on a result of this decision, the apparatus links the specified drawing ranges to which the same bit map pattern can be applied, and specifies again the drawing range in the page memory. The apparatus carries out a batch drawing into the adjacent specified drawing ranges. Therefore, it is possible to increase the drawing processing speed. As a result, it is possible to provide an effective method for the processing of an image like a picture image that has a mild gradation change.

The third and fourth aspects of the present invention provide following effects:

When the bit map pattern corresponding to the specified concentration is static data that does not change in the middle of the usage, the BLT also has static data. Therefore, it is not necessary to prepare the BLT for each page processing or each job processing. Instead, the apparatus has the data together with the bit map pattern in advance. Alternatively, the apparatus prepares the BLT only once when the apparatus is started. Based on this, it is possible to avoid the time required for preparing the BLT, and it becomes possible to achieve high-speed processing.

The fifth and twentieth aspects of the present invention provide following effects:

For batch writing the same bit map pattern into the page memory by repeating the bit map pattern according to the instruction to draw a plurality of pixels, the apparatus does not draw each bit map pattern by shifting the pattern width. Instead, the apparatus draws a single word or a plurality of words by repeating a word boundary pattern in a word unit. Based on this, it is not necessary to carry out the shift operation. As it is possible to decrease the number of times of accessing the memory, it becomes possible to further increase the drawing processing speed.

The sixth aspect of the present invention provide following effects:

The apparatus has a word boundary pattern in the memory continuous for each row (i.e., line). The apparatus only adds a constant to move the word width of the word boundary pattern to move the address to the next line. Therefore, it becomes possible to further increase the drawing processing speed.

The seventh, eighth, and twenty-first aspects of the present invention provide following effects:

The apparatus stores a once-prepared word boundary pattern in the cache memory. When the apparatus uses the same pattern again, it is possible to omit the pattern preparation processing. Therefore, it becomes possible to increase the drawing processing speed. The concentration and the row coordinate of the bit map pattern are added as attribute information, and the apparatus uses this attribute information to carry out the cache management. Based on this, it is possible to register a pattern having an optional width and an optional height into the cache memory. It is possible to re-use the data registered in the cache memory to draw all kinds of rectangular patterns to be used within the image data. Therefore, it becomes possible to further increase the drawing processing speed.

The ninth aspect of the present invention provide following effects:

It is possible to specify in advance the total memory capacity necessary for the cache memory. Therefore, it is possible to adjust the quantity to be processed by the image processing apparatus, according to the memory capacity.

The tenth and twenty-second aspects of the present invention provide following effects:

When the apparatus draws a plurality of adjacent pixels using bit map patterns having individually specified concentrations, the apparatus does not carry out the drawing processing in the individual pixel units. Instead, the apparatus carries out the drawing processing in the line unit in the main scanning (X coordinate) direction of the page memory. The apparatus uses the concentration of the bit map pattern that is the same for the line by referring to the BLT. When the adjacent pixels have the same concentration, the apparatus carries out the batch processing. Based on this, it becomes possible to increase the processing speed. This processing is particularly effective for the adjacent drawing data such as the picture image that has adjacently rectangular pixels.

The eleventh to thirteenth aspects of the present invention provide following effects:

The apparatus uses a dither pattern to express a pseudo gradation by using a dot group pattern, in the drawing processing where the expression capability of gradations in one pixel is low. Usually, there are bitmaps corresponding to the number of kinds of concentrations that can be specified (i.e., 256 patterns of 0 to 255 that can be expressed in eight bits). The apparatus draws these bit map patterns in a tiled pattern. It is possible to apply these dither patterns to the bit map patterns corresponding to the specified concentrations in the first to ninth aspects of the present invention. Based on the application of the dither patterns, it is possible to realize the effects described in (1) to (7) in the pseudo gradation processing. It is possible to obtain these effects by applying this method to the drawing processing of changing over the dither patterns for each kind of pixels to be drawn such as a character, a graphic, and an image that requires the drawing of a plurality of dither patterns. It is also possible to obtain these effects by applying this method to the color drawing processing using color components of the CMYK.

The fourteenth and fifteenth aspects of the present invention provide following effects:

The apparatus prepares dither patterns based on the threshold value table as the order table. Therefore, the apparatus can use a smaller memory capacity than when the bit map patterns are prepared.

In order to prepare the BLT based on the dither patterns it is necessary to compare bit map patterns. However, in order to prepare the BLT based on the threshold value table, the apparatus compares the concentrations. Therefore, it is possible to shorten the BLT preparation time when the threshold value table is used.

The sixteenth and twenty-third aspects of the present invention provide following effects:

When the concentrations are the same, the BLT values are also the same. Therefore, the apparatus compares the concentrations before referring to the BLT values. When the concentrations are the same, it is possible to carry out the batch drawing without referring to the BLT. Therefore, it is possible to increase the drawing processing speed.

The seventeenth aspect of the present invention provide following effects:

When a clip area is set, the apparatus does not decide about a clip range based on each pixel, but decides about a clip range based on a unit decided as the same color using the concentration and the BLT. Therefore, it is possible to reduce the load of the clip range decision processing, and it is possible to increase the drawing processing speed.

The present document incorporates by reference the entire contents of Japanese priority documents, 2002-073776 filed in Japan on Mar. 18, 2002, 2002-272746 filed in Japan on Sep. 19, 2002 and 2003-40550 filed in Japan on Feb. 19, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
an input unit that inputs a graphic drawing instruction based on image data;
a drawing processing unit that obtains and holds a bit map pattern corresponding to a specified concentration, based on the input graphic drawing instruction to fill an optionally specified range in a page memory using the specified concentration, calculates a coordinate position of holding the bit map pattern corresponding to the specified coordinate position in the page memory, and writes the drawing data using the bit map pattern of the corresponding specified concentration in a tiled pattern, into the specified range in the page memory, following the obtained coordinate position; and
an output unit that outputs the drawing data written in the page memory, to an output apparatus,
wherein the drawing processing unit decides whether the bit map patterns to be used in adjacent specified drawing ranges are the same, links the specified drawing ranges to which the same bit map pattern can be applied based on a result of the decision made, specifies again the drawing range in the page memory, and batch writes the bit map pattern into the adjacent specified drawing ranges,
wherein the bit map pattern to be used for the batch writing is a pattern in which the bit map forms a matrix shape, and a part of the same row has the same bit array in the order of concentrations, and the of the same bit array is held at any of a low concentration side and a high concentration side, and
wherein the drawing processing unit specifies a bit map pattern corresponding to a specified concentration, by using a conversion table that a non-holding concentration side uses to refer to the pattern of the same bit array.

2. The image processing apparatus according to claim 1, wherein the image processing apparatus holds the conversion table in advance.

3. The image processing apparatus according to claim 1, further comprising a conversion table preparing unit that prepares the conversion table when the apparatus starts up.

4. An image processing apparatus comprising:
an input unit that inputs a graphic drawing instruction based on image data;
a drawing processing unit that obtains and holds a bit map pattern corresponding to a specified concentration, based on the input graphic drawing instruction to fill an optionally speficied range in a page memory using the soccified concentration, calculates a coordinate position of holding the bitman pattern corresponding to the specified coordinate position in the page memory, and writes the drawing data usin the bit map pattern of the corresponding specified concentration in a tiled pattern, into the specified range in the page memory, following the obtained coordinate position;
an output unit that outputs the drawing data written in the page memory, to an output apparatus;
a word boundary bit map pattern preparing unit that prepares a word boundary bit map pattern, which has repetitions of the bit map patterns corresponding to the concentrations, to have a length that coincides with a word boundary;
a unit that caches the word boundary bit map pattern that the word boundary bit map pattern preparing unit has prepared, usine a combination of concentrations and rows as a unit; and a cache managing unit that adds a cohbentration and a bit map pattern row coordinate as attribute information to the cached word boundary bit map pattern, and manages at least one of registration, abandoning, and searching of the word boundary bit map pattern by using the attribute information, wherein the drawing processing unit decides whether the bit map patterns to be used in adjacent specified drawing ranges are the same, links the specified drawing ranges to which the same bit map pattern can be applied based on a result of the decision made, specifies again the drawing range in the page memory, and batch writes the bit map pattern into the adjacent specified drawing ranges, and wherein the drawing processing unit uses the pattern prepared by the word boundary bit map pattern preparing unit when batch writing the pattern into the page memory based on the repetitions of the same bit map pattern following the drawing instruction to draw a plurality of pixels.

5. The image processing apparatus according to claim 4, wherein the cache managing unit clears the cache memory when the word boundary bit map pattern overflows the cache memory in excess of a quantity specified in advance as a total memory capacity necessary for the caching.

6. An image processing apparatus comprising:

an input unit that inputs a graphic drawing instruction based on image data;

a drawing processing unit that obtains and holds a bit map pattern corresponding to a specified concentration, based on the input graphic drawing instruction to fill an optionally specified range in a page memory using the specified concentration, calculates a coordinate position of holding the bitman pattern corresponding to the specified coordinate position in the page memory, and writes the drawing data using the bit map pattern of the corresponding specified concentration in a tiled pattern, into the specified range in the page memory, following the obtained coordinate position;

an output unit that outputs the drawing data written in the page memory, to an output apparatus;

a word boundary bit map pattern preparing unit that prepares a word boundary bit map pattern, which has repetitions of the bit map patterns corresponding to the concentrations, to have a length that coincides with a word boundary, wherein the drawing processing unit decides whether the bit map patterns to be used in adjacent specified drawing ranges are the same, links the specified drawing ranges to which the same bit map pattern can be applied based on a result of the decision made, specifies again the drawing range in the page memory, and batch writes the bit map pattern into the adjacent specified drawing ranges, wherein the drawing processing unit uses the pattern prepared by the word boundary bit map pattern preparing unit when batch writing the pattern into the page memory based on the repetitions of the same bit map pattern following the drawing instruction to draw a plurality of pixels, wherein the drawing processing unit decides whether the specified concentrations included in the drawing instructions to draw the plurality of adjacent pixels are the same, and draws these pixels by using the word boundary bit map pattern when it is decided that the specified concentrations are the same, and wherein the drawing processing unit decides whether the specified concentrations are the same in the graphic drawing instruction that specifies a clip area, decides whether the clip area is in the unit of pixels that have been decided to have the same concentrations, and draws the clip area based on a result of this decision.

7. A drawing processing method comprising:

an input step of inputting a graphic drawing instruction based on image data; and a drawing processing step of obtaining and holding bit map pattern corresponding to a specified concentration, based on the input graphic drawing instruction to fill an optionally specified range in a page memory using the specified concentration, calculating a coordinate position of holding the bit map pattern corresponding to the specified coordinate position in the page memory, and writing the drawing data using the bit map pattern of the corresponding specified concentration in a tiled pattern, into the specified range in the page memory, following the obtained coordinate position; and outputting the drawing data written in the page memory, to an output apparatus, wherein the drawing processing step is for deciding whether the bit map patterns to be used in adjacent specified drawing ranges are the same, linking the specified drawing ranges to which the same bit map pattern can be applied based on a result of the decision made, specifying again the drawing range in the page memory, and batch writing the bit map pattern into the adjacent specified drawing ranges, wherein the bit map pattern to be used for the batch writing is a pattern in which the bit map forms a matrix shape, and a part of the same row has the same bit array in rite order of condentrations, and the pattern of the same bit array is held at any one of a low concentration side and a high concentration side, and wherein the drawing processing step is for specifying a bit map pattern corresponding to a specified concentration, by using a conversion table that a non-holding concentration side uses to refer to the pattern of the same bit array.

8. A drawing processing method comprising:

an input step of inputting a graphic drawing instruction based on image data;

a drawing processing step of obtaining and holding a bit map pattern corresponding to a specified concentration, based on the input graphic drawing instruction to fill an optionally specified range in a nage memory using the specified concentration, calculating a coordinate position of holding the bit map pattern corresnonding to the specified coordinate position in the page memory, and writing the drawing data using bit map pattern of the corresponding specified concentration in a tiled pattern, into the specified range in the page memory, following the obtained coordinate position;

outputting the drawing data written in the page memory, to an output apparatus;

a word boundary bit map pattern preparing step of preparing a word boundary bit map pattern which has repetitions of the bit map patterns corresponding to the concentrations, to have a length that coincides with a word boundary; and a step of adding a concentration and a bit map pattern row coordinate as attribute information the word boundary bit map pattern prepared at the word boundary bit map pattern preparing step, caching the word boundary bit map pattern, and managing at least one of registration, abandoning, and searching of the word boundary bit map pattern by using the attribute information wherein the drawing processing step is for deciding whether the bit map patterns to be used in adjacent specified drawing ranges are the same, linking the specified drawing ranges to which the same bit map pattern can be applied based on a result of the decision made, specifying again the drawing range in the page memory, and batch writing the bit map pattern into the adjacent specified drawing ranges, and wherein the drawing processing step is for using the pattern prepared at the word boundary bit map pattern preparing step, at the time of batch writing the pattern into the adjacent specified drawing ranges in the page memory based on the repetitions of the same bit map pattern following the drawing instruction to draw a plurality of pixels.

* * * * *